United States Patent
Göckler

Patent Number: 5,127,732
Date of Patent: Jul. 7, 1992

[54] METHOD AND ARANGEMENT FOR DETERMINING ANGULAR VELOCITIES

[75] Inventor: Heinz Göckler, Backnang, Fed. Rep. of Germany

[73] Assignee: Rheinmetall GmbH, Düsseldorf, Fed. Rep. of Germany

[21] Appl. No.: 601,401

[22] Filed: Oct. 23, 1990

[30] Foreign Application Priority Data

Oct. 24, 1989 [DE] Fed. Rep. of Germany ....... 3935357

[51] Int. Cl.$^5$ ............................................. G01C 19/72
[52] U.S. Cl. ................................................... 356/350
[58] Field of Search ......................................... 356/350

[56] References Cited

U.S. PATENT DOCUMENTS

| | | | |
|---|---|---|---|
| 4,549,806 | 10/1985 | Marten et al. | 356/350 |
| 4,765,739 | 8/1988 | Koizumi et al. | 356/350 |
| 4,796,993 | 1/1989 | Sonobe et al. | 356/350 |
| 4,883,358 | 11/1989 | Okada | 356/350 |

FOREIGN PATENT DOCUMENTS 3829731 3/1989 Fed. Rep. of Germany

*Primary Examiner*—Samuel A. Turner
*Assistant Examiner*—Lee Charles Keesee, II
*Attorney, Agent, or Firm*—Spencer, Frank & Schneider

[57] ABSTRACT

A method and circuit arrangement for determining angular velocities with the aid of an optical fiber ring interferometer includes filter circuitry for selecting the amplitudes of four adjacent spectral lines of resultant interfering light waves exiting from the interferometer, a first adder for adding amplitudes of spectral lines at the lowest and second highest frequency, a second adder for adding spectral line amplitudes at the second lowest and the highest frequency, a divider for forming a quotient by dividing a first product of the first adder's sum and the amplitude at the second highest frequency by a second product of the second adder's sum and the second lowest frequency amplitude if the second lowest frequency is an even numbered harmonic of the modulation frequency, and by dividing the second product by the first product if the second lowest frequency is an odd numbered haromonic of the modulation frequency; a first circuit device for weighting the quotient with a ratio of the ordinal of the harmonic which coincides with the second highest spectral line frequency to the harmonic which coincides with the second lowest spectral line frequency if the second lowest spectral line frequency is an even numbered harmonic of the modulation frequency, and with an inverse of the factor if the second lowest spectral line frequency is an odd numbered harmonic of the modulation frequency; and a second circuit device for using the arc tangent function on the square root of the weighted quotient to determine the Sagnac phase.

3 Claims, 1 Drawing Sheet

METHOD AND ARANGEMENT FOR DETERMINING ANGULAR VELOCITIES

CROSS-REFERENCE TO RELATED APPLICATION

The present disclosure relates to the subject matter disclosed in Country Application No. P 39 35 357.5 of the Federal Republic of Germany filed Oct. 24, 1989, the entire specification of which is incorporated herein by reference.

BACKGROUND OF THE INVENTION

The present invention relates to a method and an arrangement for determining angular velocities with the aid of an optical fiber ring interferometer, wherein light waves which pass through at least one optical fiber winding of the interferometer are sinusoidally phase modulated and the amplitudes of several spectral lines of the interfering light waves exiting from the optical fiber are determined, with the Sagnac phase, which is proportional to the angular velocity, being determined therefrom.

A method and an arrangement of this type is disclosed in U.S. Pat. No. 4,549,806 which issued on Oct. 29, 1985, the subject matter of which being incorporated herein by reference. This known ring interferometer includes an optical fiber which forms an annular path for the light in which two oppositely directed light waves are propagated. Upon leaving the optical fiber, these light waves interfere with one another. This interference depends on the angular velocity with which the optical fiber forming the at least one winding is rotated. Thus, the angular velocity is proportional to the phase difference between the two light waves that have passed through the optical fiber in opposite directions. This phase difference, the so-called Sagnac phase shift, can be determined from the amplitudes of two spectral lines of the interference light leaving the optical fiber as described in U.S. Pat. No. 4,549,806. However, this method for determining the Sagnac phase shift requires that the modulation index of the phase modulation taking place at the output of the light path be kept at a constant value by means of a control circuit in order to accurately and reliably measure the phase shift.

SUMMARY OF THE INVENTION

It is now an object of the present invention to provide a method and an arrangement of the above-mentioned type with which the Sagnac phase (which is proportional to the angular velocity) can be determined without the need for a control circuit to keep constant the modulation index of the phase modulation.

This is accomplished according to the present invention by providing an improved method for measuring angular velocities with the aid of an optical fiber ring interferometer including at least one optical fiber winding, wherein light waves which pass through the at least one optical fiber winding are sinusoidally phase modulated and the amplitudes of several spectral lines of the interfering light waves leaving the optical fiber are determined whereupon the Sagnac phase, which is proportional to the angular velocity, can be determined. The improved method includes selecting, and determining the amplitudes of, four immediately adjacent spectral lines; adding the amplitudes of the two spectral lines which respectively have the lowest and the second highest frequency of the four selected spectral lines to form a first sum amplitude; multiplying the first sum amplitude and the amplitude of the spectral line at the second highest frequency to form a first product; adding the amplitudes of the two spectral lines at the second lowest and the highest frequency of the four selected spectral lines to form a second sum amplitude; multiplying the second sum amplitude and the amplitude of the spectral line at the second lowest frequency to produce a second product; forming a quotient by dividing the first product by the second product if, of the four selected spectral lines, the second lowest frequency is an even numbered harmonic of the modulation frequency, and by dividing the second product by the first product if, of the four selected spectral lines, the second lowest frequency is an odd numbered harmonic of the modulation frequency; weighting the quotient formed by the dividing step with a factor which indicates the ratio of the ordinal of harmonic which coincides with the second highest spectral line frequency to the ordinal of the harmonic which coincides with the second lowest spectral line frequency if the second lowest spectral line frequency is an even numbered harmonic of the modulation frequency, and with an inverse of the factor if the second lowest spectral line frequency is an odd numbered harmonic of the modulation frequency; and using the arc tangent function on the square root of the weighted quotient to determine the Sagnac phase.

Another aspect of the invention for achieving the above and other objects includes a circuit arrangement for measuring angular velocities by means of an optical fiber ring interferometer which has at least one optical fiber winding defining a light path and includes means for modulating light waves propagated in opposite directions through the light path with a sinusoidal optical fiber phase modulation, and means for combining the oppositely directed light waves after circulating through the light path and for producing an optical output signal of the resultant interfering light waves. The circuit arrangement including means, receiving the optical output signal, for determining the amplitudes of several spectral lines of the interfering light waves exiting from the optical fiber and for selecting four directly adjacent spectral lines; a first adder for adding the amplitudes of the spectral lines at the lowest and second highest frequency to form a first sum amplitude; a first multiplier for multiplying the first sum amplitude and the amplitude of the spectral line at the second highest frequency together resulting in a first product; a second adder for adding the amplitudes of the two spectral lines at the second lowest and the highest frequency to form a second sum amplitude; a second multiplier for multiplying the second sum amplitude and the amplitude of the spectral line at the second lowest frequency together producing a second product; a divider, in communication with the first and second multipliers, for forming a quotient by dividing the first product by the second product if, of the four selected spectral lines, the second lowest frequency is an even numbered harmonic of the modulation frequency, and by dividing the second product by the first product if, of the four selected spectral lines, the second lowest frequency is an odd numbered harmonic of the modulation frequency; first circuit means for weighting the quotient provided by the divider with a factor which indicates the ratio of the original of the harmonic which coincides with the second highest spectral line frequency to the ordinal of the harmonic which coincides with the second lowest spectral line frequency if the second lowest spectral line frequency is an even numbered harmonic of the modulation frequency, and with an inverse of the factor if the second lowest spectral line frequency is an odd numbered harmonic of the modulation frequency; and second circuit means for suing the arc tangent function on the square root of the weighted quotient to determine the Sagnac phase.

Thanks to the invention, an expensive control circuit is no longer needed since the influence of the modulation index is circumvented in the determination of the Sagnac phase.

BRIEF DESCRIPTION OF THE DRAWINGS

The present invention will now be described in greater detail with reference to the accompanying drawings in which.

DESCRIPTION OF THE PREFERRED EMBODIMENT

Figure 1:
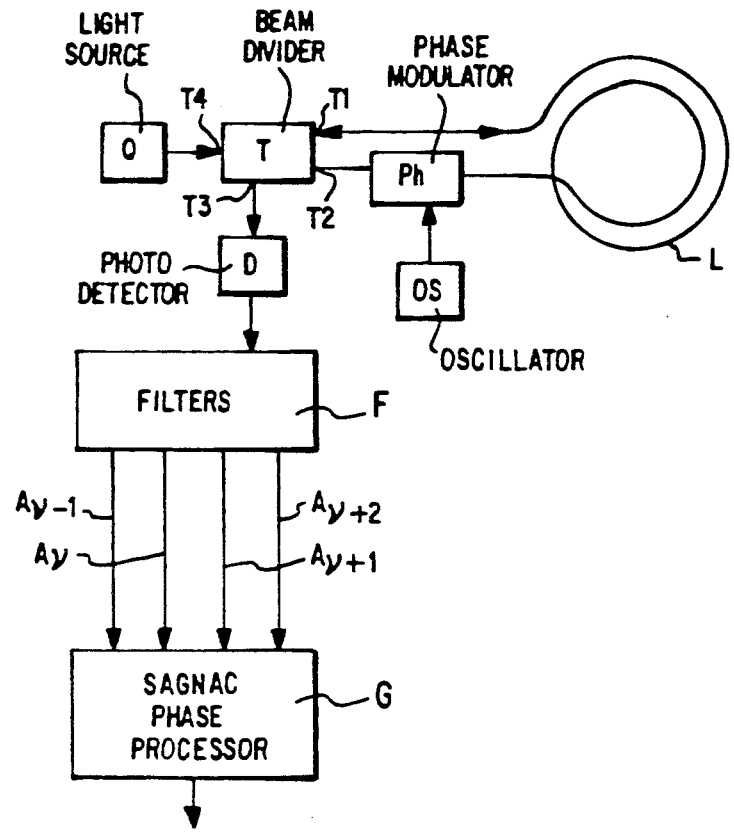
FIG. 1 is a schematic block diagram of the light conductive fiber ring interferometer arrangement according to the present invention.

As schematically shown in FIG. 1, a light beam emitted from a light source Q is fed to a beam divider T, through port T4, where the light beam is divided into first and second beams. The divided light beam exiting via ports T1 and T2, travels into both ends of a light path of a light conductive fiber coil L, circulates through fiber coil L in opposite directions and re-enters beam divider T via ports T1 and T2, respectively, where the first and second beams are combined to produce an optical output at port T3.

A phase modulation Ph, disposed in the light path of coil L, is actuated by an electrical oscillator OS in such a manner that a periodic, preferably sinusoidal optical phase modulation at the fundamental frequency $f_m$ results. Thus, the light signals circulating in the light path of coil L are phase modulated.

For further processing, the optical output signal of the optical fiber at port T3 can be converted in a known manner into an electrical signal via photodetector D. This electrical output signal i(t) of the optical fiber ring interferometer is given by:

$$i(t) = 2I_0 \cos^2\{\tfrac{1}{2}[2\phi + \psi_0 \sin 2\pi f_m t - \psi_0 \sin 2\pi f_m(t-\tau)]\} \quad (1)$$

In this equation, $I_0$ indicates the intensity of the light fed into the optical fiber, $\phi$ represents the Sagnac phase, $\psi_0$ the modulation index of the sinusoidal phase modulation performed at the frequency $f_m$ and $\tau$ represents the delay of the light waves through the optical fiber.

Further, the measuring variable to be determined, the angular velocity $\Omega$ of the fiber ring interferometer, is obtained from the following equation (2):

$$\Omega = \frac{\lambda \cdot c}{8\pi N \cdot A} \phi \quad (2)$$

where $\lambda$ is the wavelength of the light fed into the optical fiber, c is the speed of light, A the area enclosed by the optical fiber and N the number of optical fiber windings.

Thus, Equation (2) indicates that the angular velocity $\Omega$ to be measured is proportional to and directly dependent upon the Sagnac phase $\phi$. The task is now to determine the Sagnac phase $\phi$ from the output signal i(t) of the fiber ring interferometer.

Using the following addition theorems:

$$\cos x/2 = \sqrt{(1+\cos x)/2},$$

$$\sin x - \sin y = 2 \cos[(x+y)/2] \sin[(x-y)/2]$$

and the short forms $$\psi = \psi_0 \sin \pi f_m \tau = \psi_0 \sin \alpha,$$

the output signal i(t) of Equation (1) will become as follows:

$$i(t) = I_0\{1 + \cos[2\phi(t) + 2\psi \cos(2\pi f_m t - \alpha)]\} \quad (3)$$

and thus, using $$\cos(x+y) = \cos x \cos y - \sin x \sin y.$$

$$i(t) = I_0\{1 + \cos[2\phi(t)]\cos[2\psi \cos(2\pi f_m t - \alpha)] - \sin[2\phi(t)]\sin[2\psi \cos(2\pi f_m t - \alpha)]\} \quad (4)$$

With Bessel functions of the first type, Equation (4) can be converted into a form suitable for signal evaluation:

$$i(t) = I_0\{1 + \cos 2\phi \quad (5)$$

$$\left[ J_0(2\psi) + 2 \sum_{\nu=1}^{\infty} (-1)^\nu J_{2\nu}(\psi) \cos 2\nu(2\pi f_m t - \alpha) \right] -$$

$$\sin 2\phi \left[ 2 \sum_{\nu=0}^{\infty} (-1)^\nu J_{2\nu+1}(2\psi) \cos(2\nu+1)(2\pi f_m t - \alpha) \right]\}$$

Equation (5) which is, according to the above derivation from equation (1), identical to equation (1), is disclosed, for example, in Federal Republic of Germany patent application No. DE 3,829,731, published Mar. 16, 1989, and corresponding U.S. Pat. No. 4,883,358 issued Nov. 28, 1989.

The output signal i(t) in the form of equation (5) broken down into its individual spectral lines, can be written as follows:

$$\begin{aligned} i(t) = \ & I_0[1 + J_0(2\psi)\cos 2\phi] - \\ & 2I_0 J_1(2\psi)\sin 2\phi \cos(2\pi f_m t - \alpha) - \\ & 2I_0 J_2(2\psi)\cos 2\phi \cos 2(2\pi f_m t - \alpha) + \\ & 2I_0 J_3(2\psi)\sin 2\phi \cos 3(2\pi f_m t - \alpha) + \\ & 2I_0 J_4(2\psi)\cos 2\phi \cos 4(2\pi f_m t - \alpha) \\ & \cdot \\ & \cdot \end{aligned} \quad (6)$$

The factors $J_n(2\psi)$ with n=0, 1, 2, ..., are here the values of the first type of Bessel functions of the $n^{th}$ order for the argument $2\psi = 2\Omega_0 \sin \pi f_m \tau$.

A prerequisite for determining the angular velocity $\Omega(t)$ from the output signal i(t) in Equation (6) is that the change of $\Omega(t)$ over time takes place slowly so that the following applies for the bandwidth $B_\phi$ of the Sagnac phase, which can be calculated by way of a Fourier transform:

$$B_{\phi} < f_m$$

In this case, any desired spectral line of the spectral lines listed in Equation (6), whose frequencies are integral harmonics of modulation frequency $f_m$, can be separated by means of suitable filters F from which the Sagnac phase $\phi(t)$ and the angular velocity $\dot\phi(t)$ can then be determined. The amplitudes of the individual spectral lines given in (6), which can be obtained at the outputs of such filters, are then the following:

$$A_1 = 2I_0 J_1(2\psi) |\sin 2\phi|$$
$$A_2 = 2I_0 J_2(2\psi) \cos 2\phi$$
$$A_3 = 2I_0 J_3(2\psi) |\sin 2\phi|$$
$$A_4 = 2I_0 J_4(2\psi) \cos 2\phi \quad (7)$$

Generally, if $\nu$ is an even number, the $\nu^{th}$ spectral line amplitude can be written as follows:

$$A_\nu = 2I_0 J_\nu(2\psi) \cos 2\phi \quad (8)$$

Using the generally applicable equation $$J_{\nu-1}(\eta) + J_{\nu+1}(\eta) = \frac{2\nu}{\eta} J_\nu(\eta).$$

Equation (8) can be written as follows:

$$A_\nu = 2I_0 \frac{2\nu}{2\nu} [J_{\nu-1}(2\psi) + J_{\nu+1}(2\psi)] \cos 2\phi \quad (9)$$

and correspondingly $$A_{\nu+1} = 2I_0 \frac{2\nu}{2(\nu+1)} [J_\nu(2\psi) + J_{\nu+2}(2\psi)] \sin 2\phi \quad (10)$$

According to Equation (7), the amplitudes of four adjacent spectral lines of an output signal i(t) for an even numbered $\nu$ are the following:

$$A_{\nu-1} = 2I_0 J_{\nu-1}(2\psi) |\sin 2\phi|$$
$$A_\nu = 2I_0 J_\nu(2\Omega) \cos 2\phi$$
$$A_{\nu+1} = 2I_0 J_{\nu+1}(2\Omega) |\sin 2\phi|$$
$$A_{\nu+2} = 2I_0 J_{\nu+2}(2\Omega) \cos 2\phi \quad (11)$$

If one forms the quotient of the amplitudes according to Equations (9) and (10) as follows:

$$\frac{A_{\nu+1}}{A_\nu} = \frac{\nu}{\nu+1} \frac{J_\nu(2\psi) + J_{\nu+2}(2\psi)}{J_{\nu-1}(2\psi) + J_{\nu+1}(2\psi)} |\tan 2\phi|. \quad (12)$$

using Equation (11), the Sagnac phase then results as follows:

$$|\phi| = \frac{1}{2} \arctan \sqrt{\frac{\nu+1}{\nu} \frac{A_{\nu-1}}{A_\nu} \frac{A_{\nu-1} + A_{\nu+1}}{A_\nu + A_{\nu+2}}} \quad (13)$$

For the case that $\nu$ is an odd number, the Sagnac phase results correspondingly as follows:

$$|\phi| = \frac{1}{2} \arctan \sqrt{\frac{\nu}{\nu+1} \frac{A_\nu}{A_{\nu-1}} \frac{A_\nu + A_{\nu-2}}{A_{\nu-1} + A_{\nu+1}}} \quad (14)$$

As Equations (13) and (14) show, the Sagnac phase can be determined without any influence on the part of fluctuations in the intensity $I_0$ of the light fed into the optical fiber and of changes in the modulation index $\psi_0$. Therefore, the arrangement of the present invention is advantageous in that no controlling of the light intensity $I_0$ and of the modulation index $\psi_0$ is required.

The Sagnac phase $\phi$ represented in Equations (13) and (14) can be determined in the following manner with the aid of the additional circuit arrangement shown in FIG. 1 and in greater detail in FIG. 2.

Initially, four directly adjacent spectral lines are filtered out of the electrical output signal i(t) of the ring interferometer and their amplitudes $A_{\nu-1}$, $A_\nu$, $A_{\nu+1}$ and $A_{\nu+2}$ are determined by filters F as shown in FIG. 1. These selected amplitudes are then sent to Sagnac phase processor G for determination of the Sagnac phase $\phi(t)$ and the angular velocity.

Figure 2:
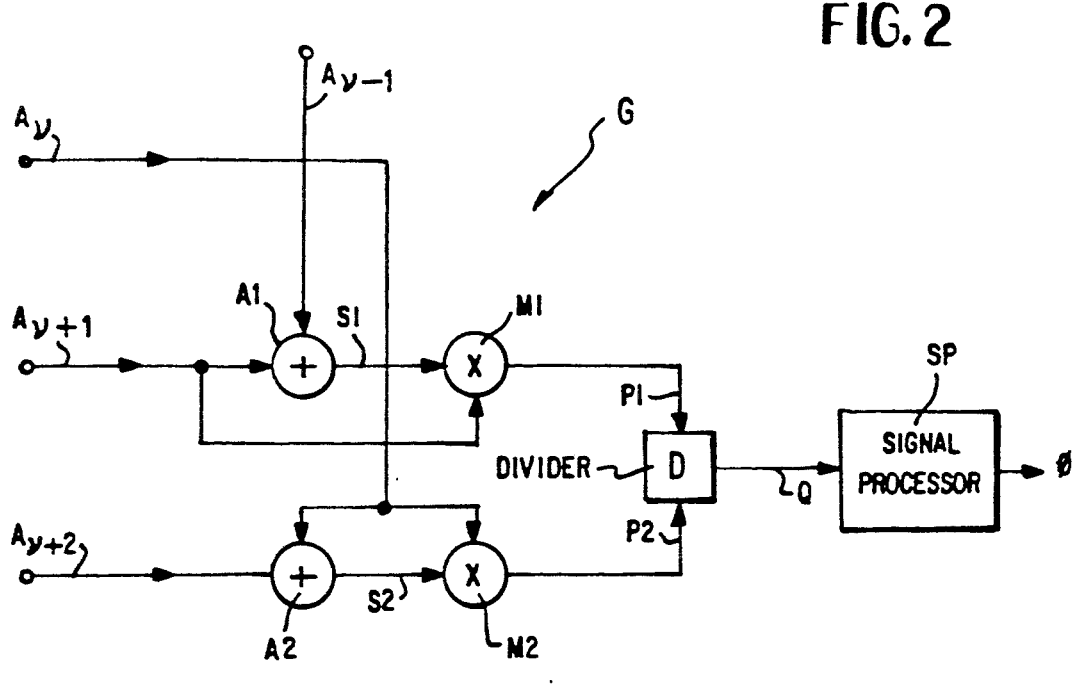
FIG. 2 is a schematic circuit diagram illustrating the Sagnac phase processor of FIG. 1 in detail.

The circuit arrangement of Sagnac phase processor G is illustrated in detail in FIG. 2. Amplitudes $A_{\nu-1}$ and $A_{\nu+1}$ of the two spectral lines at the lowest frequency of the four spectral lines (the $(\nu-1)^{th}$ harmonic of modulation frequency $f_m$) and at the second highest frequency (the $(\nu+1)^{th}$ harmonic of the modulation frequency) are summed by a first adder A1 resulting in a first sum amplitude S1. From first sum amplitude S1 and amplitude $A_{\nu+1}$ of the spectral line at the second highest frequency, a first multiplier M1 forms a first product P1. The amplitudes $A_\nu$ and $A_{\nu+2}$ of the spectral lines at the second lowest and the highest frequency are summed by a second adder A2 forming a second sum amplitude S2. A second multiplier M2 forms a second product P2 by multiplying the second sum amplitude S2 and amplitude $A_\nu$ of the spectral lines at the second lowest frequency.

The two product signals P1 and P2 are then fed to a divider D. This divider D forms a quotient $Q = P1/P2$ from the first and second product signals if the spectral line ($A_\nu$) at the second lowest frequency from among the four selected spectral lines is an even numbered harmonic of modulation frequency $f_m$. That is, if $\nu$ is an even number, the Sagnac phase $\phi$ can be determined according to Equation (13).

If the spectral line ($A_\nu$) at the second lowest frequency is an odd numbered harmonic of modulation frequency $f_m$, that is, if $\nu$ is an odd number, then divider D forms a quotient $Q = P2/P1$ from the second and the first product signal according to Equation (14).

The quotient signal Q produced by divider D is further processed in a signal processor SP so that it yields the Sagnac phase $\phi$ to be determined. In this signal processor SP, the quotient signal Q is weighted with a factor. This factor indicates the ratio $(\nu+1)/\nu$ of the ordinal $\nu+1$ of that harmonic of modulation frequency $f_m$ which coincides with the second highest $(\nu+1)$ spectral line frequency to the ordinal of that harmonic which coincides with the second lowest $(\nu)$ spectral line frequency. This factor $(\nu+1)/\nu$ is utilized to weight the quotient signal Q if the second lowest $(\nu)$ spectral line frequency is an even numbered harmonic of modulation frequency $f_m$ (that is, $\nu$ is an even number). When $\nu$ is an odd number, the corresponding quotient signal Q is weighted with the inverted factor $\nu/(\nu+1)$. From the thus weighted quotient signal, the square root is formed and finally the arc tangent function is employed. The result of these operations is then double the value of the Sagnac phase φ.

The individual operations—the weighting of the quotient signal, forming the radical and forming the arc tangent function—can be effected with individual, series-connected analog or digital circuit elements. This would require a multiplier to multiply the quotient signal with the factor, square-root forming circuit means and a function generator for generating the arc tangent function. A less expensive means to produce these operations and a preferred embodiment of the signal processor SP includes a memory in which a value can be stored for every possible quotient signal resulting from the division so as to represent the square root of the arc tangent of the respective quotient signal that has been weighted with the factor.

It will be understood that the above description of the present invention is susceptible to various modifications, changes and adaptations, and the same are intended to be comprehended within the meaning and range of equivalents of the appended claims.

What is claimed is:

1. In a method for determining angular velocities with the aid of an optical fiber ring interferometer having at least one optical fiber winding, wherein light waves which pass through the optical fiber ring interferometer are sinusoidally phase modulated and the amplitudes of several spectral lines of the interfering light waves leaving the optical fiber are determined, the improvement comprising the steps of:

selecting, and determining the amplitudes of, four immediately adjacent spectral lines;

adding the amplitudes of the two spectral lines which have the lowest and the second highest frequency of the four selected spectral lines to form a first sum amplitude and multiplying the first sum amplitude and the amplitude of the spectral line at the second highest frequency to form a first product;

adding the amplitudes of the two spectral lines at the second lowest and the highest frequency to form a second sum amplitude and multiplying the second sum amplitude and the amplitude of the spectral line at the second lowest frequency to produce a second product;

forming a quotient by dividing the first product by the second product if, of the four selected spectral lines, the second lowest frequency is an even numbered harmonic of the modulation frequency, and by dividing the second product by the first product if, of the four selected spectral lines, the second lowest frequency is an odd numbered harmonic of the modulation frequency;

weighting the quotient with a factor which indicates the ratio of the ordinal of the harmonic which coincides with the second highest spectral line frequency to the ordinal of the harmonic which coincides with the second lowest spectral line frequency, if the second lowest spectral line frequency is an even numbered harmonic of the modulation frequency, and with an inverse of said factor if the second lowest spectral line frequency is an odd numbered harmonic of the modulation frequency; and using the arc tangent function on the square root of the weighted quotient to determine the Sagnac phase.

2. A circuit arrangement for determining angular velocities by means of an optical fiber ring interferometer which has at least one optical fiber winding defining a light path, a device which modulates light waves propagated in opposite directions through the light path with a sinusoidal optical fiber phase modulation and means for combining the oppositely directed light waves after circulating through the light path and for producing an optical output signal of the resultant interfering light waves, said arrangement comprising:

circuitry means, receiving the optical output signal, for determining the amplitudes of spectral lines of the resultant interfering light waves exiting from the optical fiber, and for selecting four directly adjacent spectral lines;

a first adder for adding the amplitudes ($A_{\nu-1}$, $A_{84+1}$) of the spectral lines at the lowest and second highest frequency to form a first sum amplitude;

a first multiplier for multiplying the first sum amplitude and the amplitude ($A_{\nu+1}$) of the spectral line at the second highest frequency together to form a first product;

a second adder for adding the amplitudes ($A_\nu$, $A_{\nu+2}$) of the two spectral lines at the second lowest and the highest frequency to form a second sum amplitude;

a second multiplier for multiplying the second sum amplitude and the amplitude ($A_\nu$) of the spectral line at the second lowest frequency together to produce a second product;

divider means, in communication with the first and second multipliers for forming a quotient by dividing the first product by the second product if, of the four selected spectral lines, the second lowest frequency is an even numbered harmonic of the modulation frequency, and by dividing the second product by the first product if, of the four selected spectral lines, the second lowest frequency is an odd numbered harmonic of the modulation frequency;

first circuit means for weighting the quotient provided by said dividing means with a factor which indicates the ratio of the ordinal of the harmonic which coincides with the second highest spectral line frequency to the ordinal of the harmonic which coincides with the second lowest spectral line frequency if the second lowest spectral line frequency is an even numbered harmonic of the modulation frequency, and with an inverse of said factor if the second lowest spectral line frequency is an odd numbered harmonic of the modulation frequency; and second circuit means for using the arc tangent function on the square root of the weighted quotient to determine the Sagnac phase.

3. An arrangement as defined in claim 2, wherein said second circuit means comprises a memory in which a value can be stored for every possible quotient resulting from the division so as to represent the square root of the arc tangent of the quotient that has been weighted with the factor.

* * * * *